United States Patent
Bohn et al.

(10) Patent No.: US 8,150,438 B2
(45) Date of Patent: Apr. 3, 2012

(54) METHOD FOR INITIATING A COMMUNICATION WHILE PARTICIPATING IN ANOTHER COMMUNICATION

(75) Inventors: Thomas B. Bohn, McHenry, IL (US); Dipendra M. Chowdhary, Hoffman Estates, IL (US); Satyanarayan R. Panpaliya, Palatine, IL (US); David G. Wiatrowski, Woodstock, IL (US)

(73) Assignee: Motorola Solutions, Inc., Schaumburg, IL (US)

(*) Notice: Subject to any disclaimer, the term of this patent is extended or adjusted under 35 U.S.C. 154(b) by 435 days.

(21) Appl. No.: 12/433,754

(22) Filed: Apr. 30, 2009

(65) Prior Publication Data

US 2010/0279726 A1    Nov. 4, 2010

(51) Int. Cl.
*H04B 7/00* (2006.01)
(52) U.S. Cl. .................... 455/518; 455/520
(58) Field of Classification Search ........... 455/518–521
See application file for complete search history.

(56) References Cited

U.S. PATENT DOCUMENTS

| | | | | |
|---|---|---|---|---|
| 5,123,103 | A * | 6/1992 | Ohtaki et al. ................... | 1/1 |
| 5,125,102 | A * | 6/1992 | Childress et al. ............... | 455/9 |
| 6,882,848 | B2 * | 4/2005 | Wieczorek et al. ............ | 455/450 |
| 2006/0234748 | A1 | 10/2006 | Baik | |

OTHER PUBLICATIONS

PCT International Search Report Dated Aug. 25, 2010.
"Electromagnetic Compatibility and Radio Spectrum Matters (ERM); Digital Mobile Radio (DMR) Systems; Part 1: DMR Air Interface (AI) Protocol; ETSI TS 102 361-1" ETSI Standarsds, Lis, Sophia Antipolis, Cedex, France, vol. ERM-TG-DMR, No. V1.4.5; Dec. 1, 2007, XP014040497 ISSN:0000-0001.
Chowdhary et al—U.S. Appl. No. 12/331,180; "Method for Trunking Radio Frequency Resources"; filed Dec. 9, 2008.
Wiatrowski et al—U.S. Appl. No. 12/331,189; "Method of Efficiently Synchronizing to a Desired Timeslot in a Time Division Multiple Access Communication System"; filed Dec. 9, 2008.
Panpaliya et al—U.S. Appl. No. 12/331,167; "Method for Selecting a Channel to Be Monitored by Subscriber Units That are Idle in a Communication System"; filed Dec. 9, 2008.
Patel et al—U.S. Appl. No. 12/331,155; "Method for Ending a Call Session in a Communication System"; filed Dec. 9, 2008.
Wiatrowski et al—U.S. Appl. No. 12/331,167; "Method of Communicating Which Channel is to be Monitored by Subscriber Units That are Idle in a Communication System"; filed Dec. 9, 2008.

* cited by examiner

*Primary Examiner* — Brian Young
(74) *Attorney, Agent, or Firm* — Randi L. Karpinia; Anthony P. Curtis; Daniel R. Bestor

(57) ABSTRACT

Within a two way radio frequency communication system, a repeater transmits an identity of a rest channel when transmitting during an active communication call on a channel other than the rest channel. A subscriber unit communicating within the active communication, receives the identity of the rest channel, leaves the active communication; and initiates a new communication on the rest channel.

18 Claims, 8 Drawing Sheets

METHOD FOR INITIATING A COMMUNICATION WHILE PARTICIPATING IN ANOTHER COMMUNICATION

FIELD OF THE DISCLOSURE

The present invention relates generally to wireless trunked communication systems; and more particularly to initiating a communication in a wireless trunked communication system while participating in a previous communication.

BACKGROUND

Many varieties of trunked two-way radio communications systems are known in the art. FIG. 1 is a block diagram illustrating both a typical conventional radio system 101 and a trunked radio system 103. In the conventional radio system 101, a plurality of subscriber units are formed into talkgroups. Each talkgroup uses separate channels for communication. Thus, each talkgroup is served by one channel. In contrast, the trunked radio system 103 and its subscriber units use a pool of channels for virtually an unlimited number of talkgroups. Thus, all talkgroups are served by all channels. The trunked radio system 103 works to take advantage of the probability that not all talkgroups need a channel for communication at the same time. Estimates are made about how much load a typical user presents to the system in terms of calls per hour and duration of each call. For a traffic load, fewer channels are required since all talkgroups are served by all channels. Combining this with the number of users on the system, and the acceptable quality of service (QoS), determines how many trunked channels are required to satisfactorily serve the number of users. With a given number of channels, a much greater number of talkgroups can be accommodated as compared with conventional radio systems. Hence, a primary purpose of a trunked radio system is the efficient utilization of channels allowing for more users to carry many conversations over a fewer number of distinct channels.

As illustrated in FIG. 2, a trunked radio system can be either a centralized trunked radio system 201 or a decentralized trunked radio system 203. A centralized trunked radio system 201 uses a dedicated or exclusive channel, which is often referred to as a control channel, for communication between subscriber units and a central controller 205. Other terms that sometimes refer to the central controller 205 include trunking controller, site controller, resource allocator, channel allocator, controller, and other like terms. The subscriber units constantly monitor the control channel for channel assignment instructions. In order to start a group call (i.e., a one-to-many call), a subscriber unit requests that a channel is allocated for its use, and the central controller 205 transmits instructions telling the subscriber units in the group to switch to a traffic channel assigned for that call. A similar process is followed when a subscriber unit starts an individual call (i.e., a one-to-one call).

A decentralized trunked radio system 203, however, does not require the use of an exclusive channel. The intelligence or control function for assignment of a channel to a call remains in the subscriber units. Thus, the decentralized trunked radio system 203 can co-exist with conventional users on the same channels without the use of the control channel. When a call is initiated by a subscriber unit, the channel assignment is determined by the logic in subscriber units, not by a controller. In operation, a subscriber unit scans the channels, finds an idle channel and starts a call on the idle channel. One disadvantage of the decentralized trunked radio system 203 is that the scan to find an idle channel significantly increases the access time, which often provides for unacceptably high latency delays during call set up.

BRIEF DESCRIPTION OF THE FIGURES

The accompanying figures, where like reference numerals refer to identical or functionally similar elements throughout the separate views, together with the detailed description below, are incorporated in and form part of the specification, and serve to further illustrate embodiments of concepts that include the claimed invention, and explain various principles and advantages of those embodiments.

Figure 1:
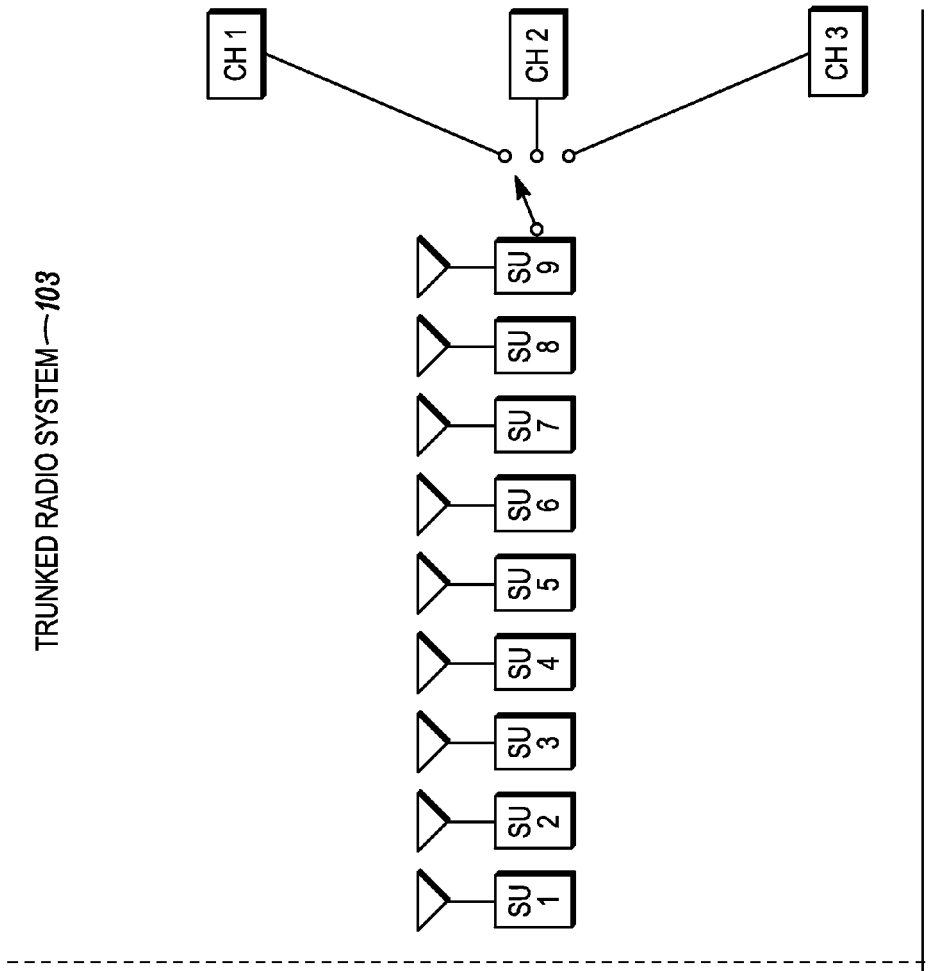
FIG. 1 is a prior art block diagram illustrating both a conventional radio system and a trunked radio system.
Figure 1:
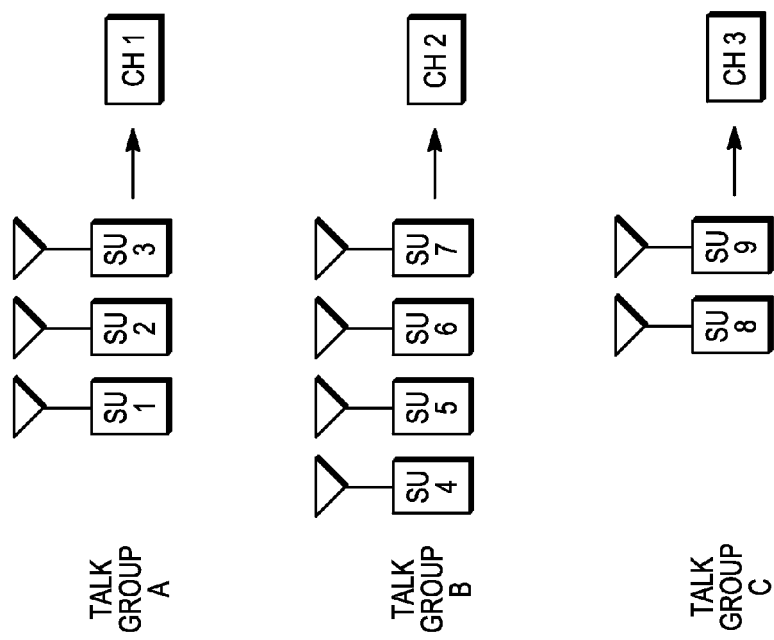
Figure 2:
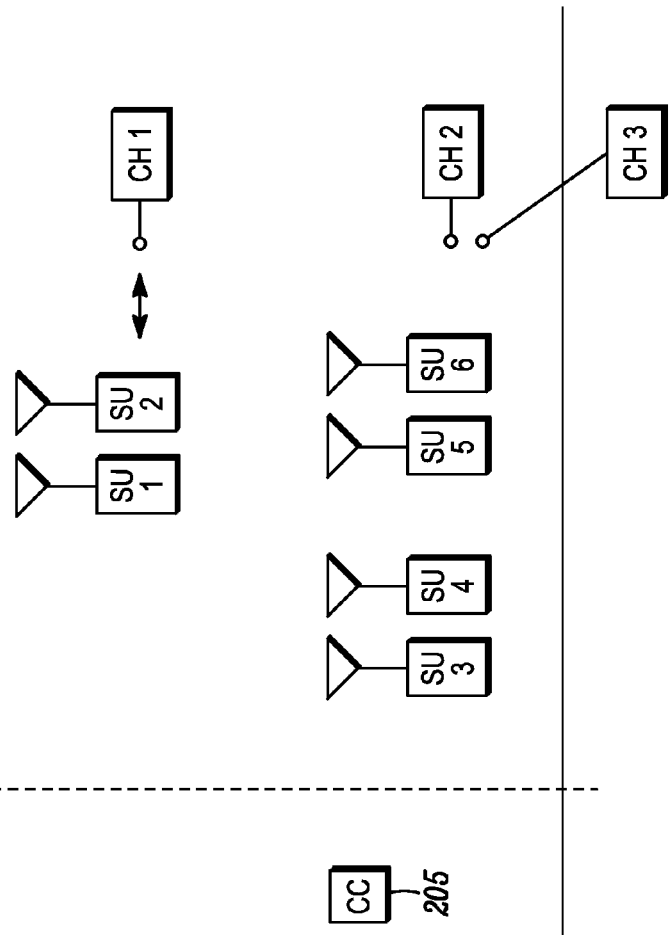
FIG. 2 is a prior art block diagram illustrating a centralized trunked radio system and a decentralized trunked radio system.
Figure 2:
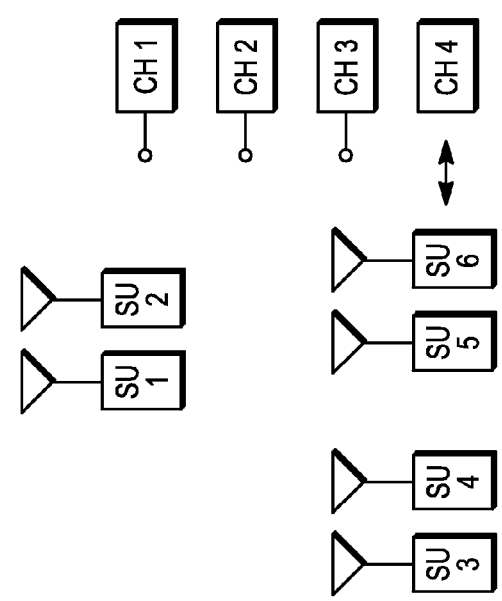

Skilled artisans will appreciate that elements in the figures are illustrated for simplicity and clarity and have not necessarily been drawn to scale. For example, the dimensions of some of the elements in the figures may be exaggerated relative to other elements to help to improve understanding of embodiments of the present invention.

The apparatus and method components have been represented where appropriate by conventional symbols in the drawings, showing only those specific details that are pertinent to understanding the embodiments of the present invention so as not to obscure the disclosure with details that will be readily apparent to those of ordinary skill in the art having the benefit of the description herein.

DETAILED DESCRIPTION

In accordance with some embodiments, within a two way radio frequency communication system, a repeater transmits an identity of a rest channel when transmitting during an active communication call on a channel other than the rest channel. A subscriber unit communicating within the active communication, receives the identity of the rest channel, leaves the active communication; and initiates a new communication on the rest channel.

In accordance with some embodiments, a method to initiate a call or control message while receiving another call is embodied in a system for trunked radio frequency (RF) resources. The RF resources being shared are sometimes also referred to as channels. A channel in a frequency division multiple access (FDMA) system comprises a frequency, while a channel in a time division multiple access (TDMA) system comprises a frequency and a timeslot, and a channel in a code division multiple access (CDMA) system comprises a frequency and a code. The configuration of some embodiments offers the advantages of both a centralized and decentralized trunked radio system by providing a call access time faster than a centralized trunked radio system, but does not require an exclusive control channel.

In accordance with some embodiments, a radio that is receiving a group call (one that the user may have no desire to receive at this time), can initiate a private call or a control message (i.e. radio check, call alert, and the like.) in a trunked system.

One method for the SU to receive information from the BR, pertaining to where a new communication can be initiated, is via the European Telecommunications Standards Institute (ETSI) Digital Mobile Radio (DMR) specification (ETSI TS 102 361) Common Announcement Channel (CACH) Short Link Control (LC) field. Any of the ETSI standards or specifications referred to herein may be obtained at http://www.etsi.org/WebSite/Standards/Standard.aspx or by contacting ETSI at ETSI Secretariat, 650, route des Lucioles, 06921 Sophia-Antipolis Cedex, FRANCE.

Figure 3:
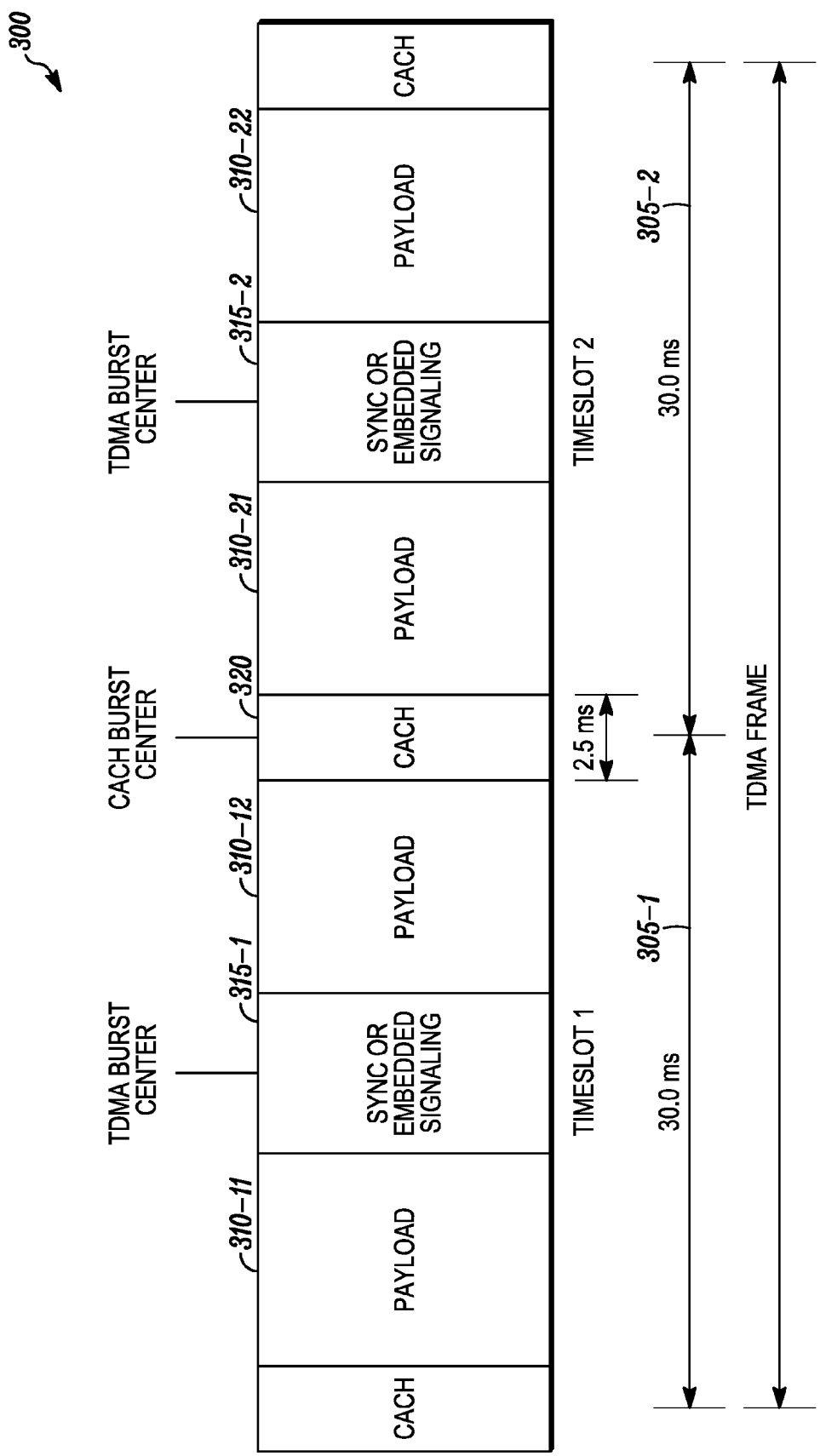
FIG. 3 illustrates an example of an outbound TDMA frame.

FIG. 3 illustrates an example of an outbound TDMA frame such as a base station sourced TDMA frame 300. For each TDMA burst 305-n, the burst structure includes two payload fields 310-nm. The center of each burst has a 48-bit synchronization or signaling field 315-n that carries either synchronization or embedded signaling. On the outbound channel, a 2.5 ms slot between each TDMA burst comprises a Common Announcement Channel (CACH) 320 that carries TDMA frame numbering, channel access indicators, and low speed signaling.

Figure 4:
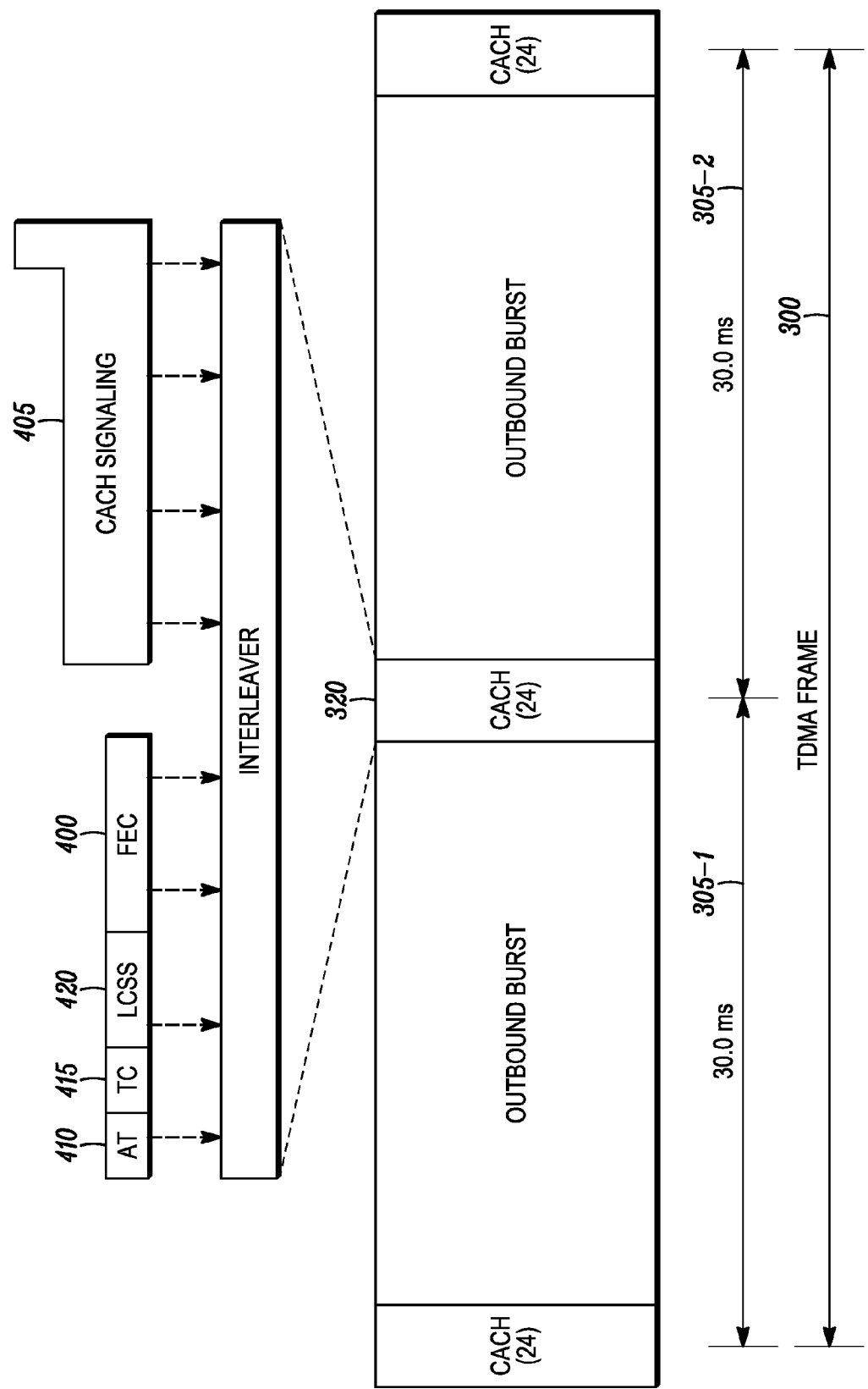
FIG. 4 illustrates further detail of a CACH within a TDMA frame.

FIG. 4 illustrates further detail of the CACH 320. As illustrated, the CACH 320 channel is not tied to channel 1 or 2 but is common between them. Of the 24 bits present in each CACH burst, 4 information and 3 parity bits are dedicated to framing and status. These bits, termed the TDMA Access Channel Type (TACT) bits, are protected by a Hamming (7,4) Forward Error Correction (FEC) code 400. The remaining 17 bits of each CACH burst carry signaling 405. No FEC is provided by the CACH for this signaling. Instead, any FEC and CRC is part of the payload. Since this is a common channel, not tied to either the channel 1 or 2, CACH bursts occur every 30 ms. Where Digital Mobile Radio (DMR) activity is present on the outbound channel, then the Access Type (AT) bit 410 in each CACH indicates whether the next slot on the inbound channel whose TDMA channel number is indicated by the TDMA Channel (TC) bit 415 is "Idle" or "Busy". Typically a base station sets the AT bit 410 to "Busy" while DMR activity is present on the inbound channel. Additionally, base stations may also set the AT bit 410 to "Busy" during the call hang time periods for voice calls and whenever activity (e.g. an acknowledgement) is anticipated on the inbound channel. Link Control Start/Stop (LCSS) 420 indicates that this CACH burst contains the beginning, end, or continuation of a Link Control (LC) or Control Signaling Block (CSBK) signaling.

It will be appreciated by those of ordinary skill in the art that all radios not currently in calls reside on the rest channel and the rest channel is where all new calls are initiated. Without this information, the subscriber unit (radio) would need to scan the system channels for the rest channel, thus significantly increasing the time required to process the request. When the user requests a private call or a control message like a remote monitor, radio check or emergency alarm, the radio will switch to the advertised rest channel to begin the new transmission. Since all radios not in calls reside on the rest channel, the probability of reaching the destination is high, thus producing an efficient system.

In today's two-way RF communications systems, subscribers are required to start new calls on the system's current Rest Channel. The Rest Channel is a channel that all idle subscribers monitor. The Rest Channel identity is dynamic—it potentially changes with every new call. New Rest Channels can be selected as frequently as approximately 3.7 times per second (approximately 13,000 calls per hour) on a very heavily loaded system. More typically, one Rest Channel change occurs approximately every two seconds. When a new call starts, Call participants remain on the channel (formerly rest channel), and Idle subscribers move to a newly designated Rest Channel. When a call ends (after Call Hangtime expires), the repeater broadcasts information about the state of the system, including the identity of the current Rest Channel. Idle subscribers move to the system's current Rest Channel.

One issue with such systems is that when a subscriber is participating in a call and a user desires to initiate a new call, the subscriber does not know the identity of the current rest channel and is therefore unable to initiate the new call. The identity of the system's current Rest Channel is not known until the end of the call as previously described herein. In other words, the subscriber is "stuck" participating in the call that it is currently receiving.

Figure 5:
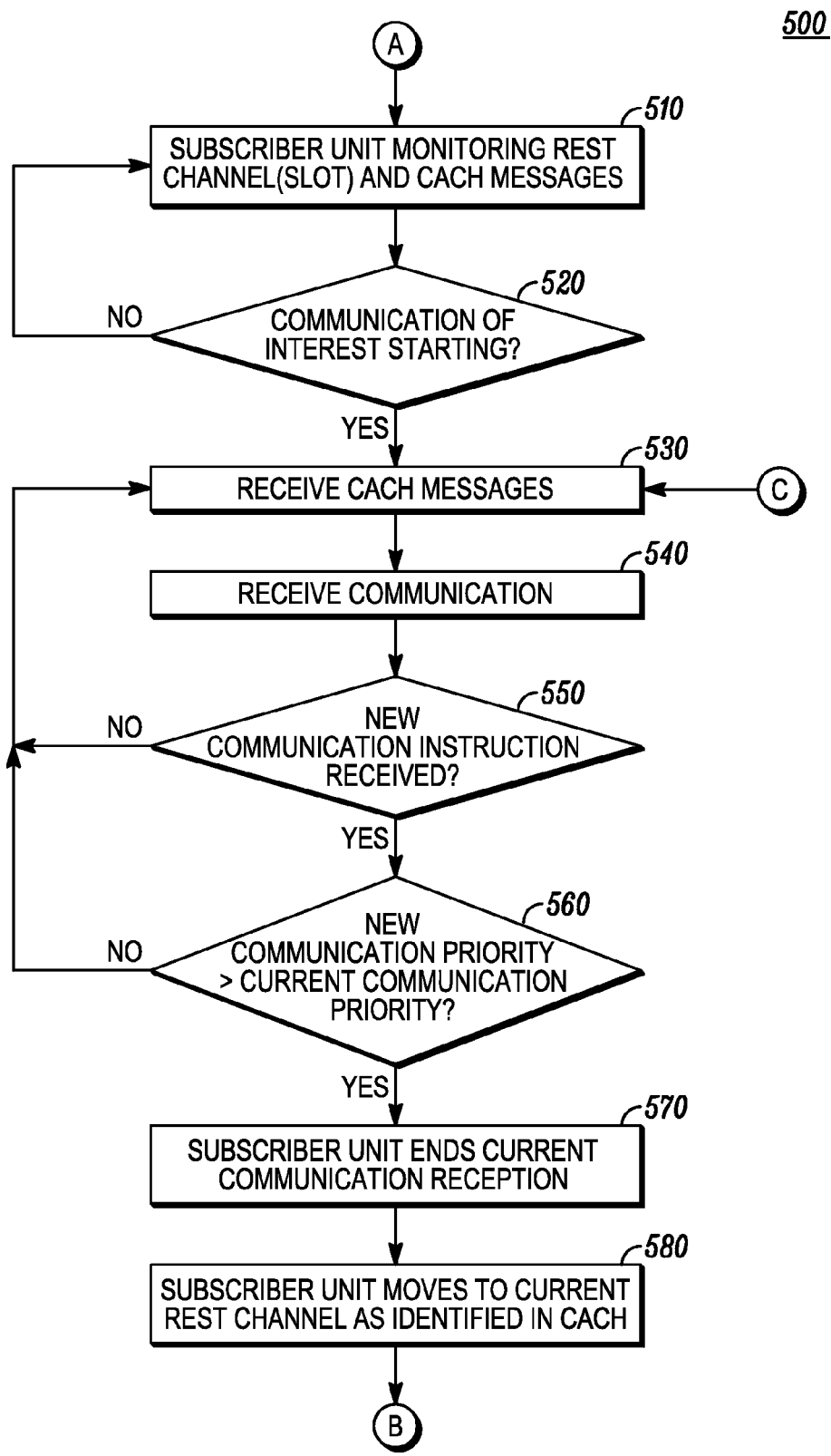
FIGS. 5 and 6 are flowcharts of a method of operation of a subscriber unit in accordance with some embodiments.

FIG. 5 is a flowchart illustrating a process 500 used by a subscriber unit (SU), while actively receiving a communication, during initiation of a new communication or call in a two-way RF communication system having at least one repeater, a plurality of channels, and a plurality of subscriber units in accordance with some embodiments.

As illustrated in FIG. 5, the operation begins with Step 510 in which the SU is monitoring the current rest channel slot and CACH messages. While monitoring, in step 520, the SU decides if a communication/call of interest is starting on the rest channel, where a communication or call of interest is directed to a group of interest or the individual SU. When no communication or call of interest is starting, the operation cycles back to Step 510 and the SU continues to monitor the rest channel while periodically checking for a call of interest in Step 520 thereafter.

When the SU identifies that a communication/call of interest is starting, the SU receives the CACH messages in Step 530. In Step 530, while receiving the current communication, the subscriber unit receives the identity of the system's current Rest Channel continuously in the CACH while a system repeater is keyed for the current communication.

Next, in Step 540, the SU receives the communication. In Step 540 in which the subscriber unit is receiving a current communication, it will be appreciated by those of ordinary skill in the art that the subscriber unit may be receiving a voice call, a data message, and the like.

The channel currently serving as the rest channel is typically, but not necessarily, an idle channel, particularly when all channels in the system that are eligible to serve as the rest channel are busy (i.e., being used for communications).

Next, in Step 550, the subscriber unit determines whether or not a new communication instruction has been received. For example, the user can instruct the subscriber unit to start a new call. The user, for example, may desire to initiate a new voice call to a different group of users or individual user. The user, for example, may desire to initiate a data call to a different user. Further, a user, for example, may desire to invoke a Control Signaling BlocK (CSBK) feature (e.g., Emergency Alarm/Call, Radio Check, Call Alert, Remote Monitor, Selective Radio Inhibit/Enable, etc.) to a different user. When no new communication instruction has been received, the operation cycles back to Step 530 and the SU continues to monitor the CACH messages while it remains in the current communication.

When a new communication instruction has been received in Step 550, the operation continues to optional Step 560 in which the subscriber unit determines whether or not the new communication (or call request) has a higher priority than the current communication. In one embodiment, for example, priorities of various communications are determined using a predefined set of rules within the subscriber unit. For example, when the current communication is an "All Call,"

the current communication priority may be higher than the new communication priority. When the new communication priority is lower than the current communication priority, the operation cycles back to Step 530 and the SU continues to monitor the CACH messages while it remains in the current communication. When the new communication priority is greater than the current communication priority, the operation continues to Step 570 in which the subscriber unit leaves the current communication. Next, in Step 580, the subscriber unit moves to the rest channel currently identified in the received CACH. The process then continues to process node B of FIG. 6.

Figure 6:
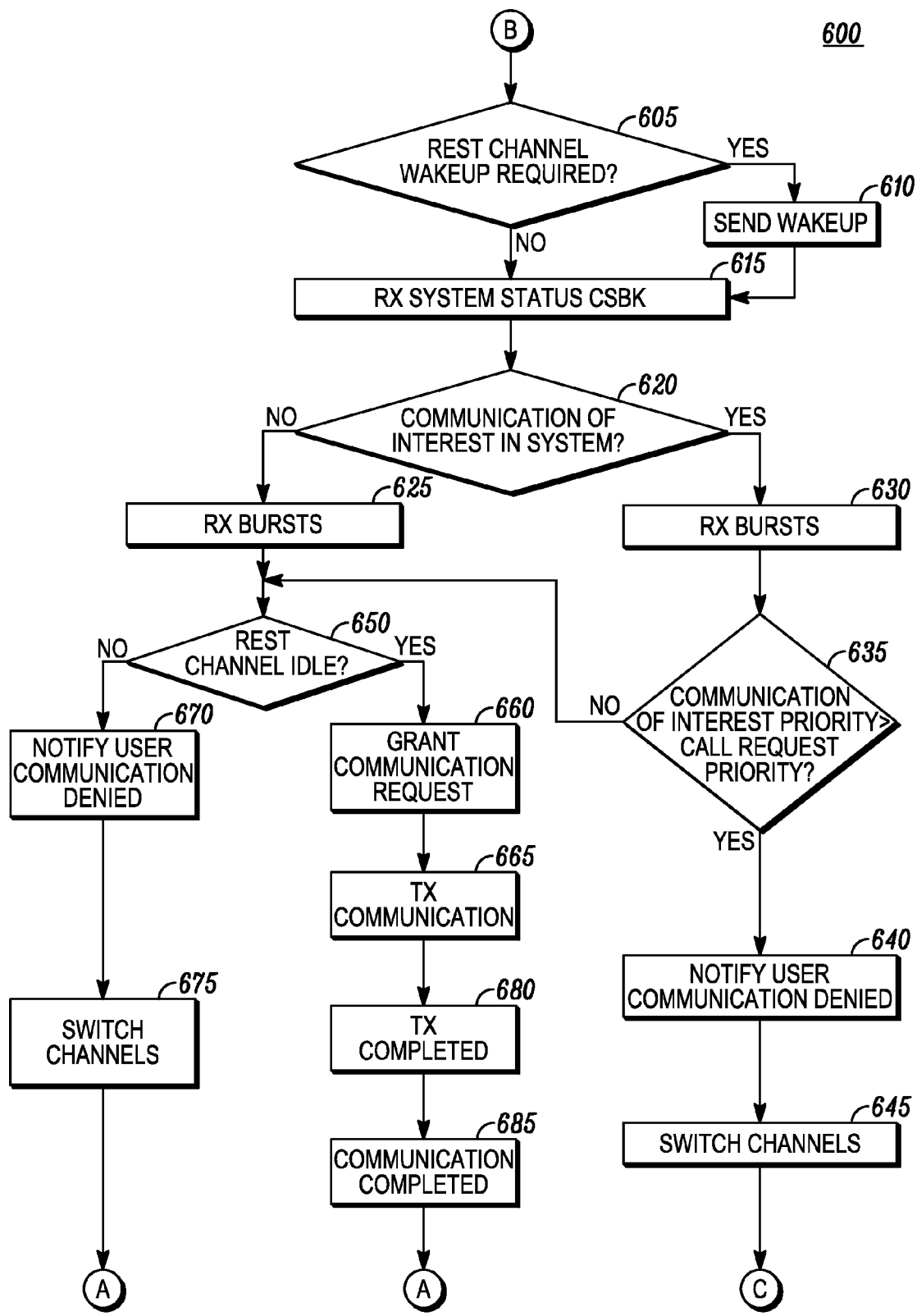

FIG. 6 is a flowchart illustrating a process used by a subscriber unit during initiation of a communication or call in a two-way RF communication system having at least one repeater, a plurality of channels, and a plurality of subscriber units in accordance with some embodiments. FIG. 6 specifically illustrates an operation 600 of a subscriber unit in initiating a new call on a rest channel.

As illustrated, the operation, after process node B, begins with Step 605 in which the subscriber has moved to the repeater hosting the rest channel and determines if it must send a wakeup message to the base repeater (BR). If the downlink is inactive (i.e. repeater is hibernating) the subscriber unit attempts to activate the downlink in step 610. Once the BR downlink is present in Step 615, the subscriber unit receives the System Status CSBK. Next, in Step 620, the subscriber unit checks if there is a communication or call of interest active in the system. The System Status CSBK broadcasts all active communications in the system. Regardless of the decision in step 620, the SU receives the bursts on the rest channel in steps 625 and 630, respectively. If there is a communication of interest active in the system, after the SU receives the bursts in Step 630, the SU checks if it is of higher priority than the requested communication in step 635. If there is a higher priority communication of interest in the system, the SU notifies the user that the current communication request is denied in Step 640. Next, in Step 645, the subscriber unit switches to the channel of the higher priority call. Next, the subscriber unit moves via process node C (i.e. Step 530 of FIG. 5) to operation within the higher priority call.

When there is not a call of interest active in the system in Step 620, after the SU receives the bursts in Step 625, and also when there is not a higher priority than the requested communication in Step 635, in Step 650, the subscriber unit determines whether or not the rest channel is idle. When the rest channel is idle, the SU grants the call request in Step 660. Next, the SU initiates the transmission in Step 665 on the rest channel. When the transmission is completed in Step 680, the SU waits for the communication to complete in Step 685 and when it does the operation cycles back to process node A. It will be appreciate by those of ordinary skill in the art that the operation may wait to switch channels and return to the rest channel (i.e. cycle back to process node A) until the further completion of Call Hangtime, additional transmissions, and the like.

When the rest channel is not idle, the user is notified that the system is busy and the call is denied in Step 670. Next, the subscriber unit switches channels in Step 675 and returns to the original call. The subscriber unit returns to operation on the previous channel and the previous communication. The operation then cycles back to process node A and Step 510 of FIG. 5.

In the flowchart illustrated in FIG. 6, the subscriber unit is only allowed to transmit its call on the channel currently serving as the rest channel if the channel is idle. Thus, if the channel currently serving as the rest channel is busy, then the subscriber unit waits for the channel to become idle, or waits until a new channel is selected to serve as the rest channel that is idle. It should be noted, however, that in other embodiments, the subscriber unit may be allowed to transmit its call even if the channel currently serving as the rest channel is not idle, for example, based on preemptive rights or priority rankings of the subscriber unit currently transmitting a call and the subscriber unit desiring to transmit a call.

Thus, assignment of a channel to initiate a call is always implied or performed before the call is requested. Since the channel is implied, a subscriber unit does not need to request a channel to start a call as required in the prior art trunked radio system, thus improving the access time and eliminating the need for a dedicated control channel, as required in a centralized trunked radio system.

Although not illustrated, in one embodiment, it will be appreciated by those of ordinary skill in the art that upon the start of the new call the rest channel can change its status from currently serving as the rest channel to a traffic channel, and a new channel in the system can be selected to serve as the rest channel for the system. Thus, the rest channel can transition into a traffic channel when the new call starts and the new channel transitions into serving as the rest channel in the system when the new call starts. It will be appreciated that in an alternative embodiment, (for example for some control messages such as call alert or radio check), the rest channel does not change. In an alternative embodiment, only one channel serves as the rest channel for the system at any given time, although more than one channel may serve as the rest channel. For ease of explanation, the description herein includes one channel serving as the rest channel at any given time, unless otherwise indicated. In some embodiments, the channel currently serving as the rest channel for the system may change often (e.g., potentially with the start of every new call).

When the subscriber unit initially moves to the Rest Channel, the Rest Channel may be broadcasting status messages that describe what groups have calls active on which channels. The subscriber unit, in accordance with some embodiments, will not join calls on other channels when leaving a call and starting a new call on the Rest Channel if the other calls are of equal or lower priority than the requested call. However, if the system contains a higher priority call than the requested call, the SU will switch channels and join the higher priority call.

Further, when a new call is initiated on the Rest Channel by another subscriber and that new call is directed to the subscriber unit that is leaving a call and starting a new call, the subscriber unit will deny the latter subscriber unit's request and join the new call being initiated already.

Figure 7:
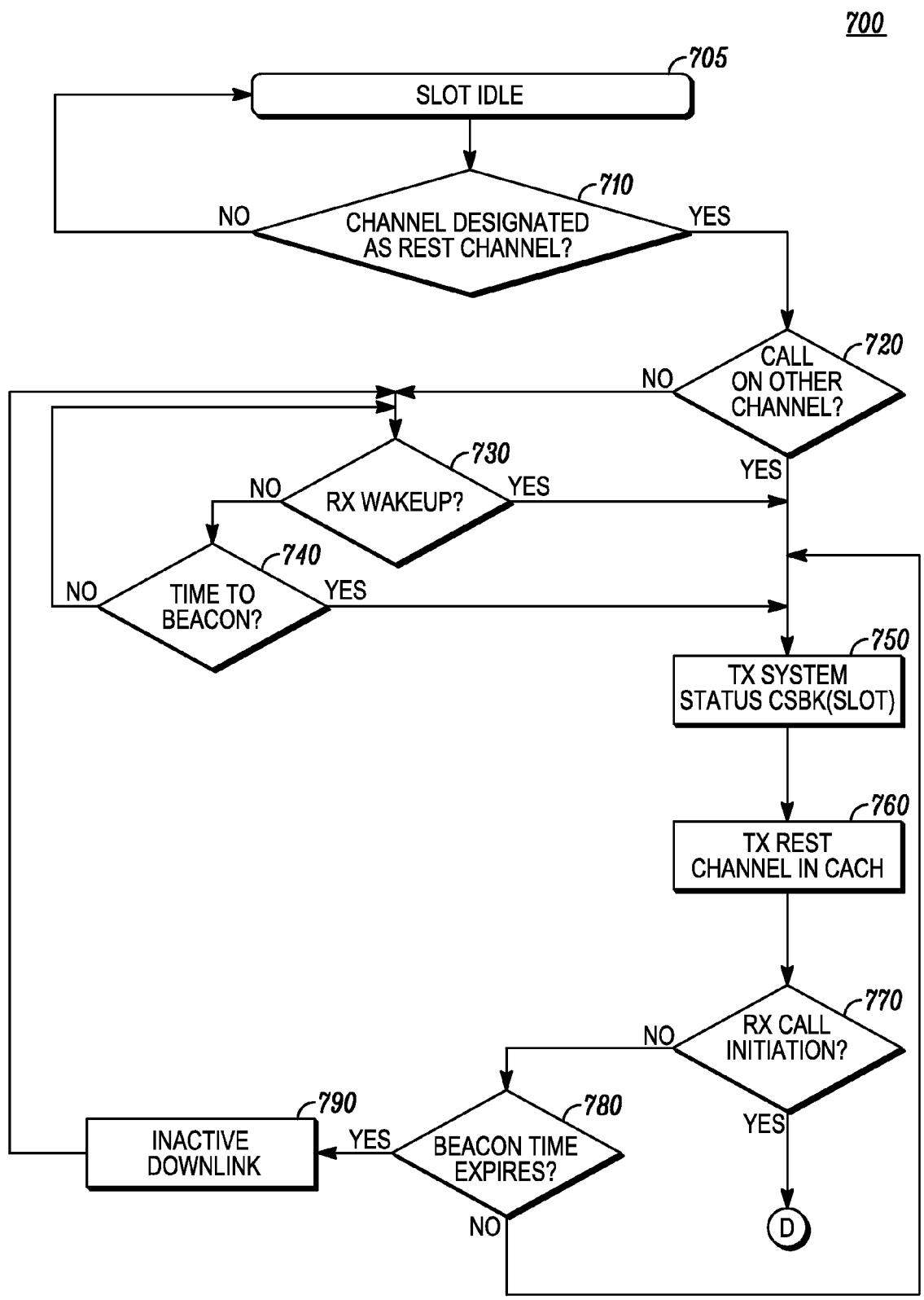
FIGS. 7 and 8 are flowcharts of a method of operation of a repeater in accordance with some embodiments.

FIG. 7 is a flowchart illustrating the operation 700 of a repeater for identifying to one or more subscriber units a current identity of the system rest channel. When the slot is idle, Step 705, the BR determines if it is the current rest channel in step 710. When the idle slot is not the current rest channel, the operation cycles back periodically between Step 705 and Step 710.

When the slot is the current rest channel, the BR determines in Step 720 whether or not another slot of the TDMA protocol is active with a call. When another slot is active with a call, in Step 750, the BR transmits System Status CSBKs in the slot(s) not active with a call. Next, in Step 760, the BR transmits the CACH messages. It will be appreciated that both the CSBKs and the CACH messages may identify the current rest channel.

Since channels may be shared with one or more co-channel users, where co-channel users are entities that share at least some RF spectrum in at least a partially overlapping geographic area, the repeater hosting the channel currently serving as the rest channel is not permitted to transmit, i.e., "to be keyed", for the sole purpose of continuously broadcasting system information as performed by a purely centralized trunked radio system. Therefore, no slot is active with a call, the BR checks for receipt of a wakeup message in Step 730. When the BR receives a wakeup message in Step 730, the BR operation continues to Step 750 in which it transmits System Status CSBKs in all slots not actives with calls, including the rest channel, and thereafter to Step 760 in which it transmits CACH messages, which may identify the current rest channel.

Additionally, the repeater that is hosting the channel currently serving as the rest channel periodically transmits a beacon signal in step 740 if the other slot(s) are not active with a call. The beacon indicates to the SUs in the system the presence and location of the channel currently serving as the rest channel via the System Status CSBK and the CACH messages. When the BR is the current rest channel and it is not active with a call, it will identify the rest channel in both the CACH messages and the System Broadcast CSBK whenever it is transmitting. Optionally, other information describing the status of at least some of the other channels in the system is also periodically transmitted (e.g., status of all channels in the system, status of only the channels in the system that have an active call, etc.). In one embodiment, the repeaters use a backend network for inter-repeater communication to share status information amongst each other, such as a wired local area network (LAN) connected to each repeater, however, the present disclosure is not limited to such a configuration. It will be recognized that the repeaters can communicate over the LAN using, for example, User Datagram Protocol over Internet protocol (UDP/IPv4).

Next, in Step 770, the repeater determines whether or not it is receiving a new active communication. If it is not, the BR next in Step 780 determines whether or not the beacon timer has expired. (A beacon timer is only active when no other slot(s) is supporting a call). When the beacon timer has expired, next in Step 790, the downlink is inactivated. When the repeater downlink is active and the slot is not hosting an active communication, the operation cycles back to steps 750 and 760 in which the repeater continuously identifies the current rest channel. If the BR is receiving a new communication, then it moves to FIG. 8 via process node D.

Figure 8:
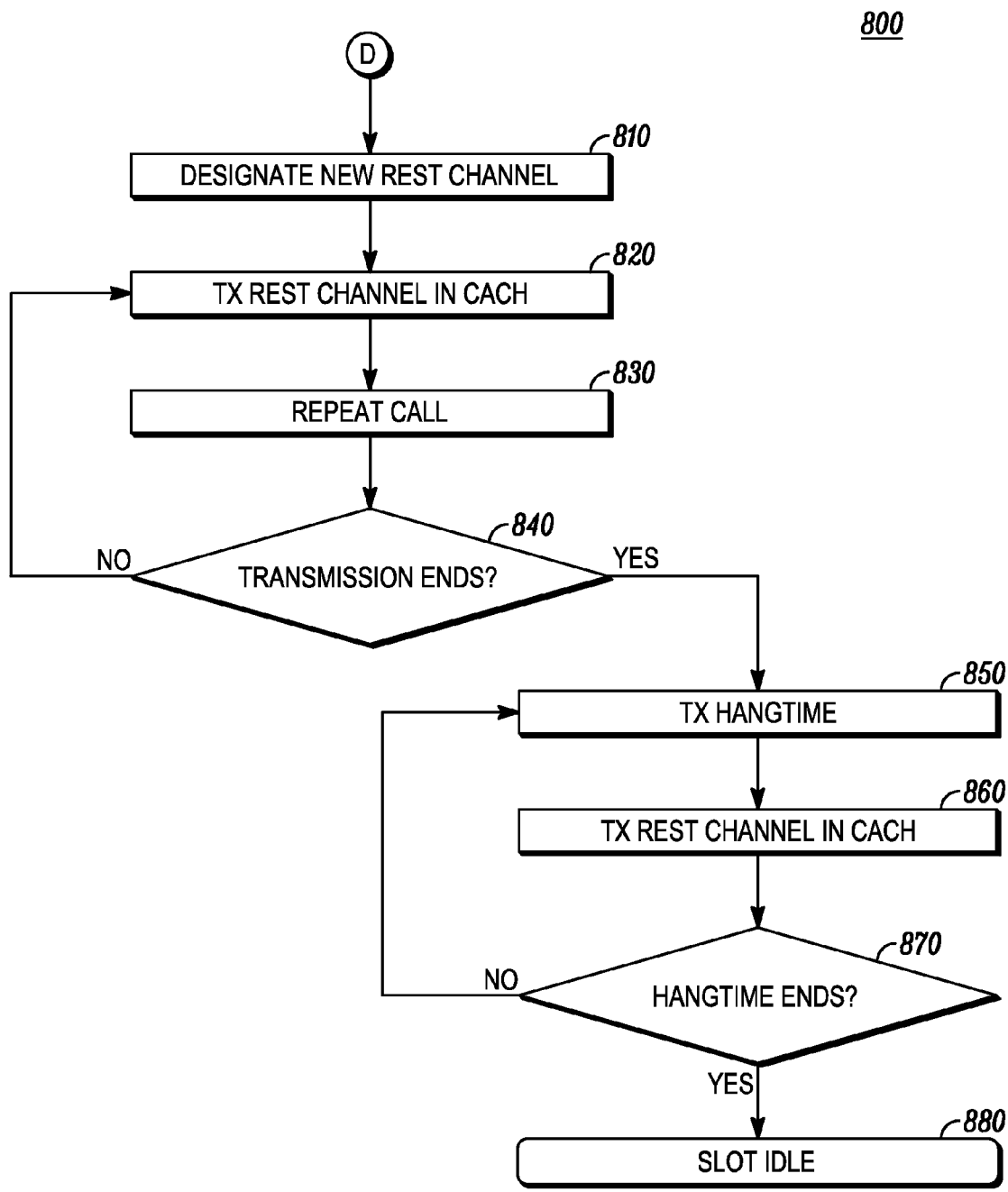

FIG. 8 is a flowchart illustrating further operation 800 of a base repeater in accordance with some embodiments. As illustrated, once a new call is received on the rest channel, the BR designates another rest channel in step 810 as the current rest channel. Next, in Step 820, the BR broadcasts the current rest in the CACH. Next, in Step 830, the BR repeats the call. Next, in Step 840, the BR determines periodically whether or not the transmission has ended. When the transmission has not yet ended, the BR continues to perform Steps 820 and 830 until the call transmission ends. When the BR determines the call transmission has ended in Step 840, the operation proceeds to Step 850 in which the BR begins to transmit call hangtime messages. The BR, in Step 860, continues to identify the system rest channel in the CACH. Next, in Step 870, the BR periodically checks to see if the hangtime has ended. When the hangtime has not yet ended, the BR continues to perform Steps 850 and 860. When the BR determines that the hangtime ends, in Step 880, the BR returns to slot IDLE.

It will be appreciated by those of ordinary skill in the art that the channel currently serving as the rest channel may change often. In order for a new channel to be selected to serve as the rest channel, all repeaters must first have knowledge of the state of the other channels in the system. To obtain this knowledge, when a repeater powers-on, the repeater registers its presence with a master repeater for the system and may do so using one of any number of known methods. Upon a successful registration by a repeater with the master repeater, the master repeater may provide the state of all the registered repeaters in the system to the repeater, and also may provide the state of the repeater to all the registered repeaters in the system.

Each of the repeaters in the system exchange the status of their channels (e.g., unusable, idle, rest, busy) with each other throughout the course of operation of the trunked system. In this case, when a channel is busy, the exchanged information may additionally comprise the type of call (e.g., group call, individual call, voice call, data call) or the target identifier/call's destination ID (i.e., the identity of the group or individual who is to receive the call). The exchanged information is used by the repeater in at least two situations, including the selection of a new channel to serve as the rest channel for the system and the formation of messages which are broadcast to subscriber units informing them of the state of at least one of the channels in the system.

In one embodiment, in a two-way RF communication system having at least one repeater, a plurality of channels, and a plurality of subscriber units, a repeater hosts a first channel that is currently serving as a rest channel for the system. At some point, the repeater determines to select a new channel to serve as the rest channel for the system, and makes a further determination as to whether there is at least one eligible channel to serve as the rest channel for the system.

A channel is considered eligible to serve as the rest channel for the system when the hardware and/or software for the repeater hosting the channel is operational, when the hardware and/or software for the repeater hosting the channel is enabled, or when the repeater hosting the channel does not detect interference. If there is at least one eligible channel in the system, the repeater selects the new channel to serve as the rest channel from one of the eligible channels in the system. Once the new channel is selected to serve as the rest channel for the system, the identity of the new channel is broadcast to the other repeaters in the system.

It is advantageous for the new channel that is selected to serve as the rest channel for the system to be selected from one of the eligible channels that are currently idle in the system, however, it is not necessary. If, however, all the channels that are eligible to serve as the rest channel are busy, then, it continues to serve as the rest channel in addition to, for example, transmitting the call. Thus, under these conditions, the first channel plays dual roles as both the rest channel and a busy traffic channel (i.e., a busy rest channel).

Meanwhile, if a channel becomes idle that is eligible to serve as the rest channel, then that channel is selected to serve as the rest channel for the system. The repeater hosting the busy rest channel informs the repeater that is hosting the eligible channel that just became idle that it is now hosting the channel that is serving as the rest channel. The repeater hosting the busy rest channel also informs the subscriber units monitoring the busy rest channel of the channel that is currently serving as the rest channel for the system.

There may be various reasons for determining to select a new channel to serve as the rest channel for the system. Some example reasons may be, but not limited to, a new call starting on the channel currently serving as the rest channel, the repeater hosting the channel currently serving as the rest channel has failed, the repeater hosting the channel currently serving as the rest channel has become disabled, the repeater hosting the channel currently serving as the rest channel has detected interference, or the like. When the repeater hosting the channel currently serving as the rest channel fails, becomes disabled, or detects interference, the channel is no longer eligible to serve as the rest channel; moreover, if any of these conditions occur, a new channel is selected to serve as the rest channel.

The embodiments described herein provide the capability to exit a call and start a new call in a two-way trunked radio communication system. This method provides a faster call-setup time at a lower overall system cost when compared with other approaches by broadcasting the current rest channel to subscriber units during a voice call on a digital trunked system without a central controller.

In the foregoing specification, specific embodiments have been described. However, one of ordinary skill in the art appreciates that various modifications and changes can be made without departing from the scope of the invention as set forth in the claims below. Accordingly, the specification and figures are to be regarded in an illustrative rather than a restrictive sense, and all such modifications are intended to be included within the scope of present teachings.

The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

Moreover in this document, relational terms such as first and second, top and bottom, and the like may be used solely to distinguish one entity or action from another entity or action without necessarily requiring or implying any actual such relationship or order between such entities or actions. The terms "comprises," "comprising," "has", "having," "includes", "including," "contains", "containing" or any other variation thereof, are intended to cover a non-exclusive inclusion, such that a process, method, article, or apparatus that comprises, has, includes, contains a list of elements does not include only those elements but may include other elements not expressly listed or inherent to such process, method, article, or apparatus. An element proceeded by "comprises . . . a", "has . . . a", "includes . . . a", "contains . . . a" does not, without more constraints, preclude the existence of additional identical elements in the process, method, article, or apparatus that comprises, has, includes, contains the element. The terms "a" and "an" are defined as one or more unless explicitly stated otherwise herein. The terms "substantially", "essentially", "approximately", "about" or any other version thereof, are defined as being close to as understood by one of ordinary skill in the art, and in one non-limiting embodiment the term is defined to be within 10%, in another embodiment within 5%, in another embodiment within 1% and in another embodiment within 0.5%. The term "coupled" as used herein is defined as connected, although not necessarily directly and not necessarily mechanically. A device or structure that is "configured" in a certain way is configured in at least that way, but may also be configured in ways that are not listed.

It will be appreciated that some embodiments may be comprised of one or more generic or specialized processors (or "processing devices") such as microprocessors, digital signal processors, customized processors and field programmable gate arrays (FPGAs) and unique stored program instructions (including both software and firmware) that control the one or more processors to implement, in conjunction with certain non-processor circuits, some, most, or all of the functions of the method and/or apparatus described herein. Alternatively, some or all functions could be implemented by a state machine that has no stored program instructions, or in one or more application specific integrated circuits (ASICs), in which each function or some combinations of certain of the functions are implemented as custom logic. Of course, a combination of the two approaches could be used.

Moreover, an embodiment can be implemented as a computer-readable storage medium having computer readable code stored thereon for programming a computer (e.g., comprising a processor) to perform a method as described and claimed herein. Examples of such computer-readable storage mediums include, but are not limited to, a hard disk, a CD-ROM, an optical storage device, a magnetic storage device, a ROM (Read Only Memory), a PROM (Programmable Read Only Memory), an EPROM (Erasable Programmable Read Only Memory), an EEPROM (Electrically Erasable Programmable Read Only Memory) and a Flash memory. Further, it is expected that one of ordinary skill, notwithstanding possibly significant effort and many design choices motivated by, for example, available time, current technology, and economic considerations, when guided by the concepts and principles disclosed herein will be readily capable of generating such software instructions and programs and ICs with minimal experimentation.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

We claim:

1. A method of operation of a wireless communication device operating in a trunked radio system having a rest channel on which idle wireless communication devices reside and await new call notifications, the method comprising:
   participating in a first call on a first channel in the trunked radio system;
   periodically receiving an identity of the rest channel on the first channel while participating within the first call;
   responsive to detecting a request to begin a new second call, leaving the first call on the first channel, switching to the rest channel, and initiating the new second call on the rest channel.

2. A method as claimed in claim 1, wherein the wireless communication device comprises a subscriber unit operating within a two way radio frequency communication system.

3. A method as claimed in claim 2, wherein the identity of the rest channel is received on the first channel within a Common Announcement Channel (CACH) field of one or more messages.

4. A method as claimed in claim 3, wherein the CACH field is sent by a system repeater when keyed for the first call.

5. A method as claimed in claim 1, wherein the first call comprises one or more of a voice call and a data message.

6. A method as claimed in claim 1, wherein the rest channel comprises an idle channel.

7. A method as claimed in claim 1, wherein the new second call comprises one or more of a new voice call, a new data call, and a new control signaling block feature.

8. A method as claimed in claim 1, further comprising, prior to leaving the first call and initiating the new second call:
receiving a communication instruction for the new second call.

9. A method as claimed in claim 8, further comprising in response to receiving the communication instruction:
determining if the new second call has a higher priority than the first call;
remaining in the first call when the new second call does not have a higher priority than the first call; and
leaving the first call and initiating the new second call when the new second call has a higher priority than the first call.

10. A method as claimed in claim 9, wherein a first priority of the first call and a second priority of the new second call are determined using a predefined set of rules within the subscriber unit.

11. A method as claimed in claim 9, further comprising:
notifying an initiator of the communication instruction that the new second call is denied when the new second call does not have a higher priority than the first call.

12. A method as claimed in claim 1 further comprising leaving the first call to initiate the new second call on the rest channel:
determining whether the rest channel is idle; and
returning to the first call without initiating the new second call when the rest channel is not idle.

13. A method as claimed in claim 12, further comprising:
informing a user of the wireless communication device that the new second call has been denied when the rest channel is not idle.

14. A method as claimed in claim 12, further comprising when the rest channel is not idle:
receiving an identity of a new rest channel;
determining whether the new rest channel is idle;
returning to the first call without initiating the new second call when the new rest channel is not idle; and
leaving the first call and initiating the new second call on the new rest channel when the new rest channel is idle.

15. A method as claimed in claim 12, further comprising:
periodically determining whether the rest channel is idle; and
leaving the first call and initiating the new second call on the rest channel when the rest channel is idle.

16. A method as claimed in claim 12, further comprising:
identifying one of a preemptive right and a priority ranking of the wireless communication device; and
initiating the new second call on the rest channel when the rest channel is not idle based on one of the identified preemptive right and the priority ranking 17. A method of operation of a two way radio frequency communication system, the method comprising:
within a repeater operating within the two way radio frequency communication system:
transmitting an identity of a current rest channel within at least one of a Common Announcement Channel (CACH) message and a Control Signaling Block (CSBK) message during an active communication call on another channel; and
within a subscriber unit operating within the two way radio frequency communication system:
communicating within the active communication on the another channel;
receiving the identity of the rest channel on the another channel within the at least one of the Common Announcement Channel (CACH) message and the Control Signaling Block (CSBK) message from the repeater;
leaving the active communication; and
initiating a new communication on the rest channel.

18. A method as claimed in claim 17, further comprising within the subscriber unit:
determining if the new communication has a higher priority than the active communication;
remaining in the active communication when the new communication does not have a higher priority than the active communication; and
leaving the active communication and initiating the new communication when the new communication has a higher priority than the active communication.

* * * * *

UNITED STATES PATENT AND TRADEMARK OFFICE
CERTIFICATE OF CORRECTION

PATENT NO.       : 8,150,438 B2                                                Page 1 of 1
APPLICATION NO.  : 12/433754
DATED            : April 3, 2012
INVENTOR(S)      : Bohn et al.

It is certified that error appears in the above-identified patent and that said Letters Patent is hereby corrected as shown below:

On the title page, item (56), under "OTHER PUBLICATIONS", in Column 2, Line 4, delete "Standarsds," and insert -- Standards, --, therefor.

In Column 11, Line 28, Claim 12, delete "claim 1" and insert -- claim 1, --, therefor.

In Column 12, Line 13, Claim 16, delete "ranking" and insert -- ranking. --, therefor.

Signed and Sealed this
First Day of January, 2013

David J. Kappos
*Director of the United States Patent and Trademark Office*